(12) United States Patent
Apt et al.

(10) Patent No.: US 10,733,491 B2
(45) Date of Patent: *Aug. 4, 2020

(54) FINGERPRINT-BASED EXPERIENCE GENERATION

(71) Applicant: Amazon Technologies, Inc., Reno, NV (US)

(72) Inventors: Daniel Apt, London (GB); Roberto Fulton Figueroa Cruces, Seattle, WA (US); Richard Glazier, London (GB); Steven Susi, London (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,940

(22) Filed: May 9, 2019

(65) Prior Publication Data

US 2019/0266461 A1    Aug. 29, 2019

Related U.S. Application Data

(63) Continuation of application No. 15/585,931, filed on May 3, 2017, now Pat. No. 10,354,176.

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01); *G06K 19/06112* (2013.01)

(58) Field of Classification Search
CPC .................................................. G06K 19/0637
USPC ............................................. 235/494; 726/7
See application file for complete search history.

(56) References Cited

U.S. PATENT DOCUMENTS

| | | |
|---|---|---|
| 6,588,015 B1 | 7/2003 | Eyer et al. |
| 6,959,166 B1 | 10/2005 | Gabai |
| 7,028,082 B1 | 4/2006 | Rosenberg et al. |
| 8,428,621 B2 | 4/2013 | Vorbau et al. |
| 9,253,551 B1 | 2/2016 | Lewis |

(Continued)

FOREIGN PATENT DOCUMENTS

WO     2014/015110     1/2014

OTHER PUBLICATIONS

Non-Final Office Action issued in co-related U.S. Appl. No. 15/585,931 dated Apr. 19, 2018.

(Continued)

*Primary Examiner* — Allyson N Trail
(74) *Attorney, Agent, or Firm* — Hogan Lovells US LLP

(57) ABSTRACT

Experience fingerprints can be generated that are unique but correspond to a recognizable fingerprint template, where each fingerprint can correspond to a word of a visual language. Image data can be captured that includes a representation of an experience fingerprint, and the fingerprint can be analyzed by a remote system or service to determine an experience to be provided. The experience can be a general experience to be provided for any request relating to a specific fingerprint received over a period of time, or the experience can be selected, modified, or generated based upon contextual information for the request, such as information for a user or device submitting the request. The experience can include audio, video, text, or graphical content, as may be presented using one or more devices.

20 Claims, 7 Drawing Sheets

(56) References Cited

U.S. PATENT DOCUMENTS

| | | | |
|---|---|---|---|
| 9,408,996 | B2 | 8/2016 | Pompilio, III et al. |
| 9,548,053 | B1* | 1/2017 | Basye .................. G06F 16/683 |
| 9,990,926 | B1* | 6/2018 | Pearce .................. G10L 15/04 |
| 9,996,819 | B1 | 6/2018 | Modi |
| 10,034,053 | B1 | 7/2018 | Trollope |
| 10,298,640 | B1 | 5/2019 | Luke |
| 2001/0034640 | A1 | 10/2001 | Chaum |
| 2001/0053945 | A1 | 12/2001 | Hayashi |
| 2002/0010584 | A1 | 1/2002 | Schultz |
| 2002/0053089 | A1 | 5/2002 | Massey |
| 2003/0236843 | A1 | 12/2003 | Weber et al. |
| 2004/0002868 | A1 | 1/2004 | Geppert |
| 2004/0237759 | A1 | 12/2004 | Bill |
| 2005/0245317 | A1 | 11/2005 | Arthur |
| 2005/0265527 | A1 | 12/2005 | Creamer |
| 2006/0015560 | A1 | 1/2006 | MacAuley |
| 2007/0106726 | A1 | 5/2007 | Rosenberg |
| 2007/0214471 | A1 | 9/2007 | Rosenberg |
| 2008/0101765 | A1 | 5/2008 | Lee |
| 2008/0120616 | A1 | 5/2008 | James |
| 2008/0242221 | A1 | 10/2008 | Shapiro et al. |
| 2009/0112689 | A1 | 4/2009 | Peterson |
| 2010/0273553 | A1 | 10/2010 | Zalewski |
| 2011/0053559 | A1 | 3/2011 | Klein |
| 2011/0197134 | A1* | 8/2011 | Kulmala ................ G06Q 50/01 715/736 |
| 2012/0069977 | A1 | 3/2012 | Oberoi |
| 2012/0302156 | A1 | 11/2012 | Anstandig |
| 2012/0322041 | A1 | 12/2012 | Weisman |
| 2013/0073632 | A1 | 3/2013 | Fedorov et al. |
| 2013/0191857 | A1 | 7/2013 | Guinn |
| 2013/0346332 | A1 | 12/2013 | Schalk |
| 2014/0129935 | A1 | 5/2014 | Ovadia Nahon |
| 2014/0229866 | A1 | 8/2014 | Gottlieb |
| 2014/0274203 | A1 | 9/2014 | Ganong, III |
| 2015/0039338 | A1 | 2/2015 | Tregnaghi |
| 2015/0264573 | A1 | 9/2015 | Giordano et al. |
| 2015/0289023 | A1 | 10/2015 | Richman |
| 2015/0289025 | A1 | 10/2015 | McLeod |
| 2015/0382047 | A1 | 12/2015 | Van Os |
| 2016/0225187 | A1 | 8/2016 | Knipp |
| 2016/0277476 | A1 | 9/2016 | Pawlik et al. |
| 2016/0314329 | A1* | 10/2016 | Papazian .......... G06K 19/06037 |
| 2016/0337059 | A1 | 11/2016 | Nehls et al. |
| 2016/0380953 | A1* | 12/2016 | Mashtakov .......... G06F 16/954 709/204 |
| 2017/0124664 | A1 | 5/2017 | Savenok et al. |
| 2017/0149711 | A1 | 5/2017 | Shaw |
| 2017/0180438 | A1 | 6/2017 | Persson |
| 2017/0193206 | A1 | 7/2017 | Vadlamudi |
| 2017/0221273 | A1 | 8/2017 | Haseltine |
| 2017/0270356 | A1 | 9/2017 | Sills et al. |
| 2017/0346880 | A1 | 11/2017 | Gay et al. |
| 2018/0098023 | A1 | 4/2018 | Landy |
| 2018/0286426 | A1 | 10/2018 | Abramson |

OTHER PUBLICATIONS

Final Office Action issued in co-related U.S. Appl. No. 15/585,931 dated Oct. 16, 2018.
Notice of Allowance issued in co-related U.S. Appl. No. 15/585,931 dated Mar. 13, 2019.
Non-Final Office Action issued in co-related U.S. Appl. No. 15/831,205 dated Sep. 6, 2018.
Final Office Action issued in co-related U.S. Appl. No. 15/831,205 dated Jan. 30, 2019.
Notice of Allowance issued in co-related U.S. Appl. No. 15/831,205 dated Apr. 2, 2019.
International Search Report and Written Opinion issued in International Application No. PCT/US2018/062874 dated Feb. 26, 2019.
Non-Final Office Action issued in co-related U.S. Appl. No. 15/882,741 dated Aug. 13, 2018.
Notice of Allowance issued in co-related U.S. Appl. No. 15/882,741 dated Jan. 11, 2019.
Notice of Allowance issued in co-related U.S. Appl. No. 15/882,741 dated Feb. 21, 2019.
Kiss Radio, "You Control the Music", Oct. 2017. pp. 1-3.
Non-Final Office Action issued in co-related U.S. Appl. No. 15/882,678 dated Dec. 2, 2019.

* cited by examiner

FINGERPRINT-BASED EXPERIENCE GENERATION

CROSS-REFERENCE TO RELATED APPLICATIONS

This application is a continuation of allowed U.S. application Ser. No. 15/585,931, entitled "FINGERPRINT-BASED EXPERIENCE GENERATION", filed May 3, 2017, the full disclosure of which is incorporated herein by reference for all purposes.

BACKGROUND

Users are increasingly using portable computing devices, such as smartphones, to access various types of content. In some instances, a user can scan a quick response (QR) code using a QR scanner application installed on the device to enable information encoded in the image to be conveyed to the software on the smartphone. There are several standards used to encode data as a QR code, and each QR code will have a corresponding representation of the information to be conveyed, such as a web link to be opened or contact information to be provided. The information encoded in the QR code cannot be changed, such that new codes must be generated if alternative information is to be provided. Since QR codes are often attached to physical items, this generation and placement of new QR codes is impractical at best.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing targeted content to a user. In particular, various embodiments provide for the use of experience fingerprints that can correspond to a visual language useful in providing experiences to users. A user can scan a fingerprint, such as by capturing image data including a representation of an experience fingerprint, and can cause that information to be analyzed for purposes of obtaining an experience. The fingerprint data can be analyzed by a remote system or service that can determine, based on the data associated with the fingerprint that was scanned, an experience to provide for the user. The experience can be an experience for any request presenting data for that fingerprint over a period of time, or the experience can be selected, modified, or generated based upon contextual information for the request, such as information for a user or device submitting the request. The experience can include any combination of audio, video, text, or graphical content, for example, as may be presented using one or more devices.

Various other applications, processes and uses are presented below with respect to the various embodiments.

Figure 1A:
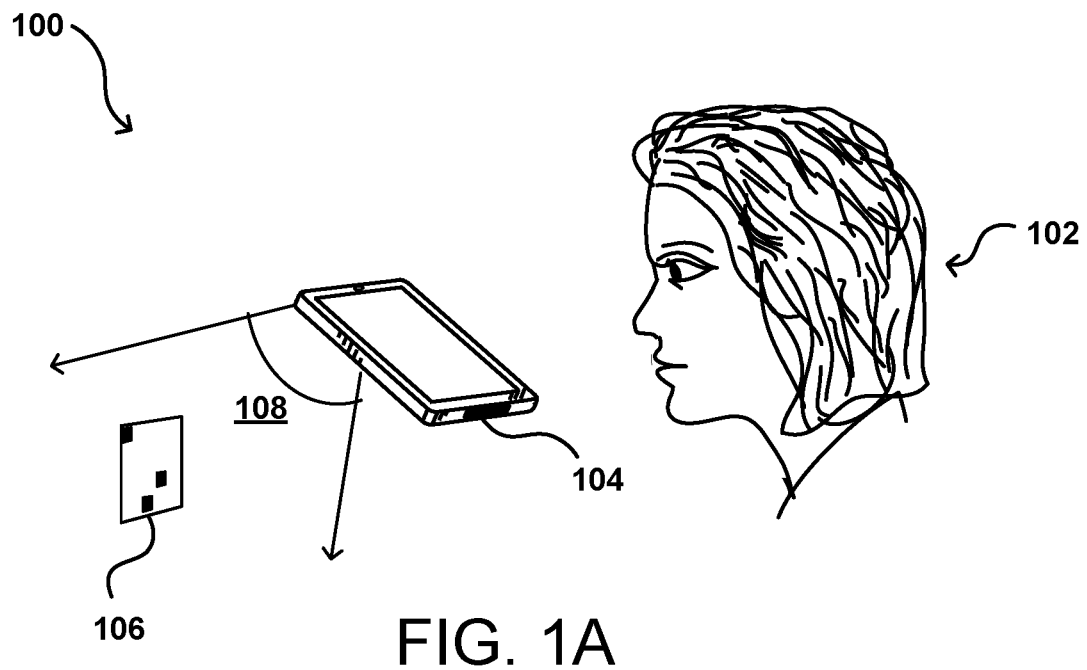
FIGS. 1A and 1B illustrate an example situation in which a fingerprint pattern is scanned with a portable computing device in accordance with one embodiment.
Figure 1B:
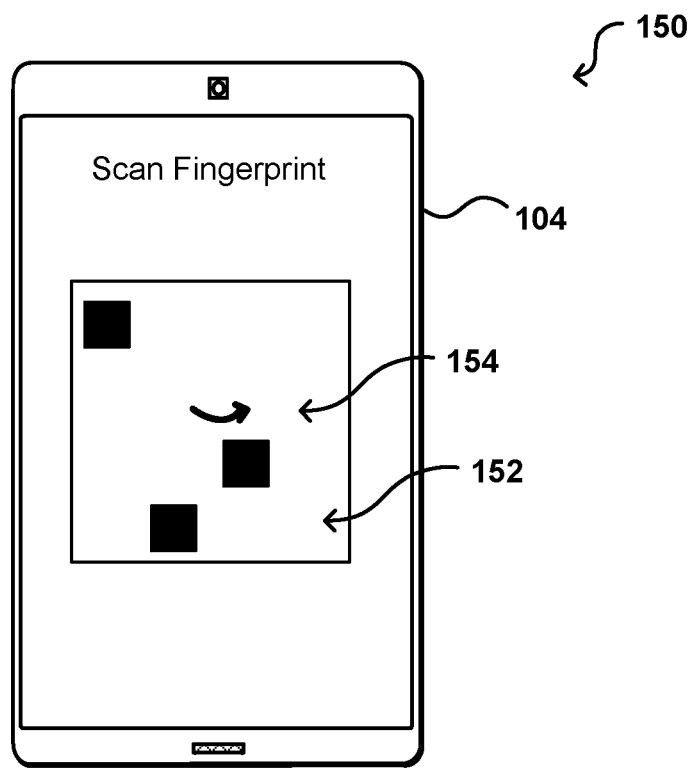

FIGS. 1A and 1B illustrate an example approach to capturing information for an experience fingerprint, or other such code or visual language, that can be utilized in accordance with various embodiments. In the example situation 100 of FIG. 1A, a user 102 is utilizing a computing device 104. Although a portable computing device (e.g., a smart phone, an e-book reader, or tablet computer) is shown, it should be understood that various other types of electronic devices which are capable of displaying video content can be used in accordance with various embodiments discussed herein. These devices can include, for example, desktop computers, notebook computers, personal data assistants, video gaming consoles or controllers, wearable computers (e.g., a smart watch or glasses), and portable media players, among others. In this example, an experience fingerprint 106 is present on an item or object. As discussed in more detail elsewhere herein, the experience fingerprint 106 can include a representation of a word or phrase of a visual language, for example, that can be expressed through a set of unique patterns or designs. If the user is interested in obtaining the experience corresponding to the fingerprint, the user can position the device 104 such that the fingerprint 106 is located within a field of view 108 of at least one camera, or other imaging sensor or capture technology, of the device 104.

FIG. 1B illustrates an example display 150 that can be generated on the computing device 104. The user can have opened or accessed an application or functionality on the device that can capture and process experience fingerprints and/or other visual language representations. In some embodiments an interface of the application can cause a "live view" of the camera to be displayed on the display screen of the device. The view shows a representation of the information being captured by the camera, which can help the user to position the device such that the experience fingerprint is adequately represented in the captured image data. This can include, for example, ensuring that the fingerprint is sufficiently contained within the field of view so that a majority of the fingerprint is represented, as well as ensuring proper size or zoom level, centering or alignment, and other such aspects. The relative arrangement of the representation needed in the image can vary based on a number of different factors, such as the complexity of the fingerprint, the resolution of the camera, the analysis approach needed, etc. Further, in some embodiments the user must cause a specific image to be captured for analysis, while in other embodiments the analysis will happen on the "live feed" from the camera, such that no capture action need to be initiated by the user. For the live feed analysis, the analysis can happen on each frame or a subset of frames, where the subset can be based on a regular interval, amount of movement, or other such factors. Further, in some embodiments at least a portion of the image analysis can be performed on the computing device, while in other embodiments at least a subset of the image data can be transmitted to a remote system or server for analysis.

Once a representation of the experience fingerprint is contained within the captured image data, the representation can be analyzed to determine the corresponding information. As indicated, a visual language can be utilized such that the fingerprint can indicate a specific word, phrase, identifier, or other such element. The visual language includes a set of possible patterns, states, or configurations that can be used to represent the various words. When the image data is analyzed, the visual word can be determined and information for that visual word passed to the appropriate system, service, or component for generating, selecting, or otherwise providing the appropriate experience. This can include, for example, providing a mechanism for the computing device to obtain, generate, or otherwise provide the determined experience. Also, as described in more detail elsewhere herein, the experience provided can be determined dynamically in response to receiving the visual word and using other information associated with the user or device. The experience provided thus can be different for different users, different locations, different times of day, different sessions or scans, or other such variants.

Figure 2A:
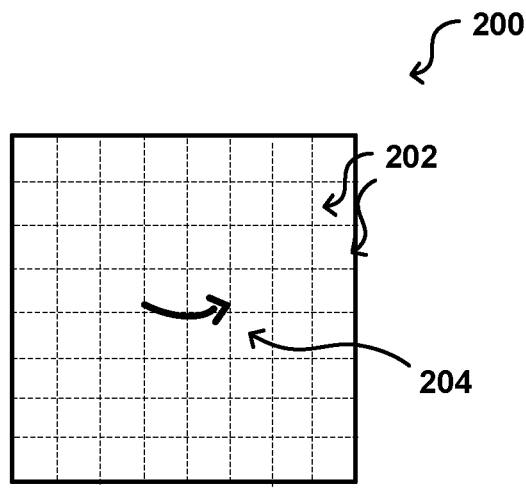
FIGS. 2A, 2B, 2C, and 2D illustrate an example fingerprint patterns that can be utilized and/or generated within the scope of various embodiments.

FIGS. 2A through 2D illustrate example representations of a visual language, or experience fingerprints, that can be utilized in accordance with various embodiments. FIG. 2A illustrates an example pattern or template 200 that can be utilized for a visual language in accordance with various embodiments. It should be understood that the type of template used can vary for different embodiments or implementations, and in this example will include distinguishable regions that can be used to convey the visual words. The type of template used in at least some embodiments should allow for many variations in fingerprints, but within a design framework that enables a variation to accurately be identified as a fingerprint of that type. The regions can thus be at least substantially non-overlapping and of an appropriate size, shape, color, or other distinguishable aspect. In this example, the template includes a grid of a specific size, in this case an 8×8 grid, although other sizes such as 16×16 or 8×24 can be used as well within the scope of the various embodiments. The number of cells 202 in the grid can be determined based upon factors such as the number of unique words in the visual language and the capability of the hardware to distinguish between different visual words. Aspects of the template may have meaning in some embodiments, such as where the line color, fill color, or shape indicates the visual language or library to use, or otherwise indicate how the information is to be interpreted. In this example, the template also includes a source graphic 204, such as a logo or other graphical element, that can be selected and/or used for a number of different purposes. For example, the source graphic can indicate a type of experience to be obtained, or at least information about a source of the experience or entity associated with the experience. The graphic 204 can also provide information about the visual language to be used or how to interpret the visual word represented by the fingerprint. The graphic 204 can also provide a sense of direction, as a logo can indicate which portion of the fingerprint should be interpreted as the "top" of the fingerprint, for example, as for a square grid the represented word would typically differ if the fingerprint were viewed from an incorrect direction or angle. It should be understood, however, that in some embodiments the words can be represented using patterns such that directionality does not impact the interpretation. In other words, the pattern or fingerprint is unique based on the relevant position and independent of the directional orientation of the fingerprint as a whole.

Figure 2B:
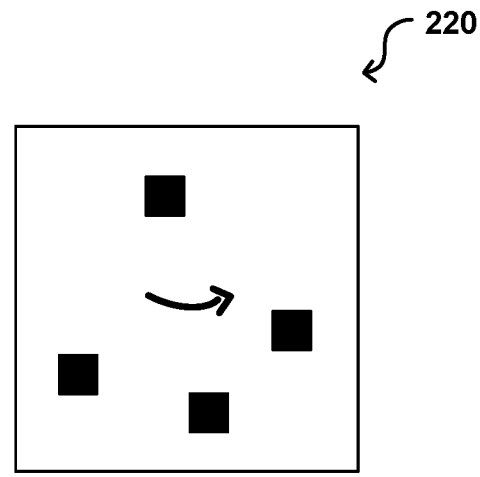

In the example template 200 of FIG. 2A there can be a large number of visual words (or identifiers or other elements) represented through the selection of a number of cells to be filled in, or made of a specific color or fill pattern, as well as the selection of which cells to be filled in. This can include at least one cell and up to all cells, using the same or different colors for different cells or combinations of cells. As long as the pattern can be uniquely and repeatably identified, the pattern can be used and associated with a visual word. FIG. 2B illustrates an example experience fingerprint 200 that can be generated using such a template. In this example, a selection of four cells is determined, where those cells are filled with a different color than a bulk fill of the template. The cells do not need to be completely filled or filled with a similar shape, but some type of indicator should be placed within each selected cell such that the selection of that cell can be determined. The generation of the fingerprint should also be unique such that no other fingerprint exists with the same pattern or selection and there will be no confusion as to the experience to be provided. The logo is also represented in a determined location, which for this template is always in the middle with a specific orientation but it should be understood that the placement of the logo can vary in other fingerprints as well. The fingerprint should be such that when image data is captured including a representation of the fingerprint, that representation should be able to be analyzed and the placement of the selected cells determined with confidence such that the corresponding visual word can be determined. As mentioned, however, in at least some embodiments the permissible selection of cells of the fingerprint template are such that any given fingerprint is orientation-agnostic, such that the orientation of the fingerprint need not be determined using the source graphic or any other such mechanism.

Figure 2C:
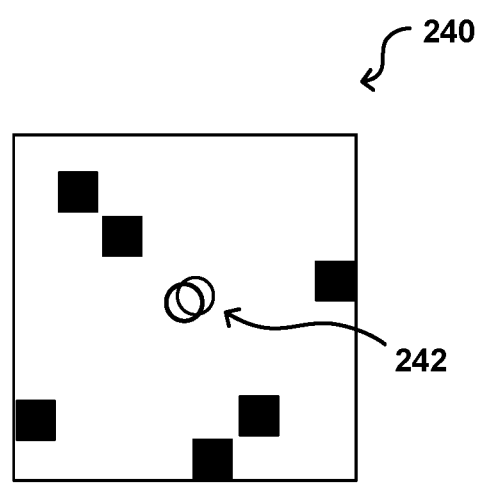

FIG. 2C illustrates another example fingerprint 240 that could be generated using the example template 200 of FIG. 2A. In this example, a different number and arrangement of cells has been selected to represent the corresponding visual word. As mentioned, this can also include a different background or foreground color than was used for the fingerprint 220 of FIG. 2B. In this example the logo 242 or graphical element has also been changed, as may correspond to a logo for a different provider or entity associated with the experience. A device capturing a representation of this fingerprint 240 should not only be able to distinguish the fingerprint 240 from that of the fingerprint 220 in FIG. 2B, but should also be able to accurately and repeatably determine the corresponding visual words for each fingerprint.

Figure 2D:
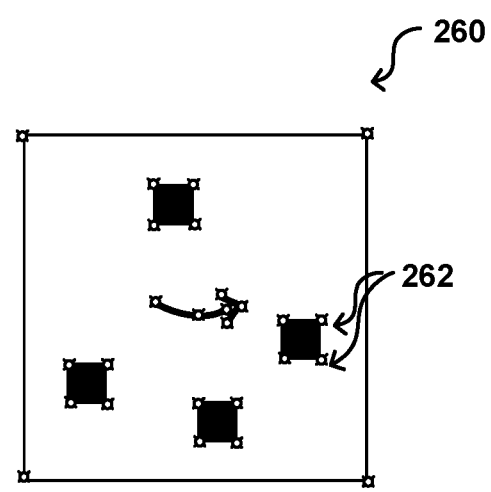

In one embodiment, a feature detection process can be used that attempts to quickly determine features of the image that correspond to a fingerprint, as well as the relevant elements of that fingerprint. For example, FIG. 2D illustrates an analyzed fingerprint 260 wherein corner features are detected, as represented by the small corner graphical elements 262. Other types of features can be detected as well, such as edge, shapes, contours, blobs, ridges, points of interest, and the like. Feature detection approaches (e.g., MSER or PCBR) can attempt to locate any interesting or unique aspect to an image that can be used to recognize or identify an object represented in the image data. Various other types of image recognition or analysis can be used as well within the scope of the various embodiments. In some embodiments the image data will be analyzed on the device to attempt to locate such features, which can at least provide an indication of whether a fingerprint is likely represented in the image. In some embodiments the image data can be transmitted to a remote system for analysis. In other embodiments the computing device might also attempt to determine which features correspond to the fingerprint, can determine the relative positions of those feature points, and can send the feature point information (i.e., as coordinates or one or more feature vectors) for analysis by a remote system, which can significantly reduce the amount of data transmitted. Minimizing data transmission can be important for users with mobile data plans, for example, that charge based on the amount of data transmitted. Such an approach may be slightly less accurate than analyzing an image using cloud services with much larger capacity, but the design of the fingerprint template can be such that the information can be adequately determined using the personal device of the user in at least some embodiments. The relative positions of the feature points can then be used to determine information such as the type of logo included, the orientation of the logo, and the relative positions of the selected cells or features of the fingerprint. The relative positions can then be compared to a library of fingerprints to determine the corresponding fingerprint pattern, which can then be used to determine the corresponding visual word. In some embodiments, a mapping is maintained that enables a lookup of the visual word once the fingerprint is identified. As discussed later herein, the visual word can then be used to determine the experience to provide.

Figure 3:
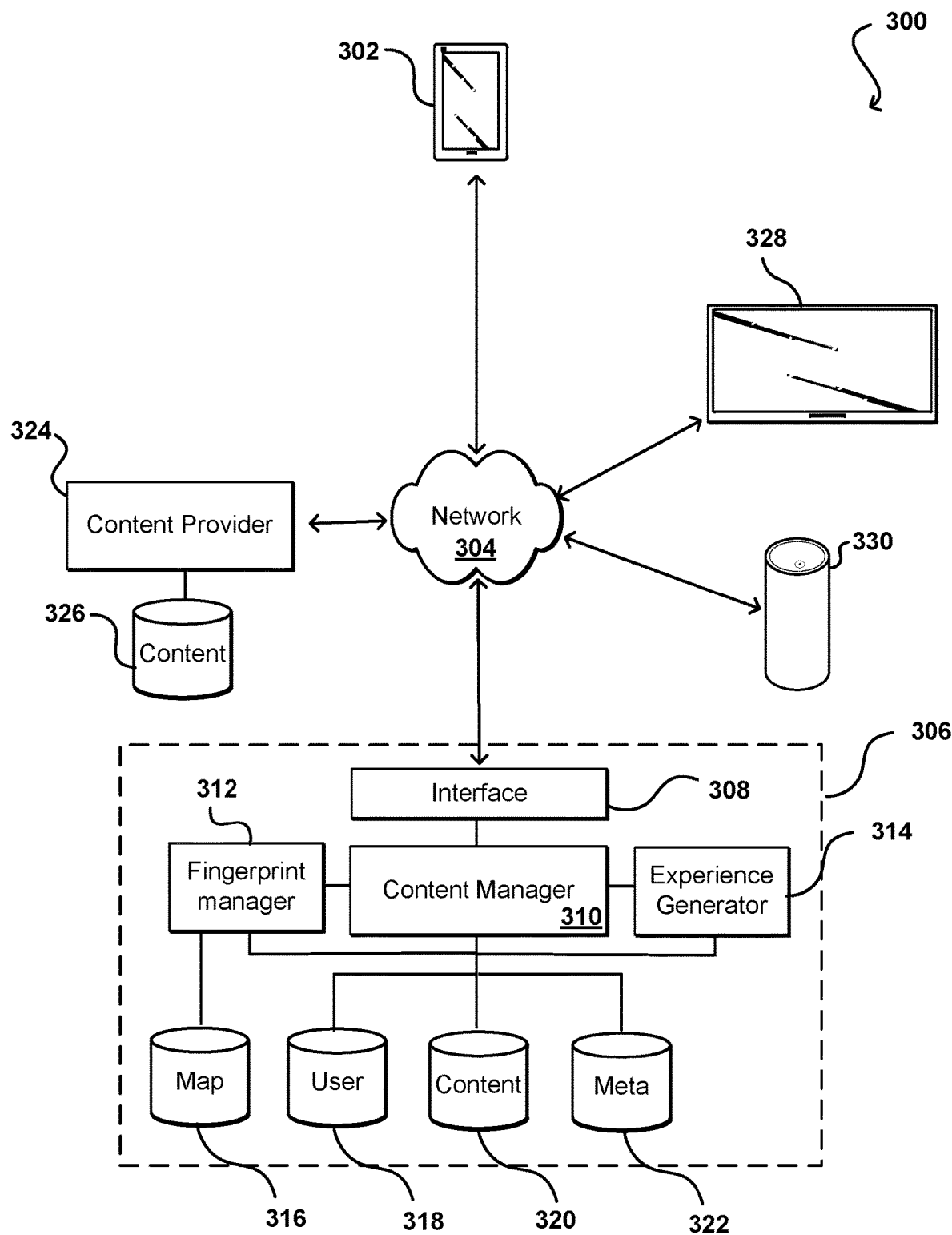
FIG. 3 illustrates an example environment in which portions of the various embodiments can be implemented.

FIG. 3 illustrates an example environment 300 in which aspects of various embodiments can be implemented. In this example, a user is able to utilize an electronic device 302, such as a smart phone, smart watch, or tablet computer, to transmit content over at least one network 304, such as the Internet, a cellular network, a local area network, and the like. As known for such purposes, a user can utilize a client device to submit information in a request for content, and in response the content can be identified, downloaded, streamed, or otherwise transferred to the device. In this example, a user can have an account with a service provider associated with a service provider environment 306. In some embodiments, the user can utilize the service to obtain information relating to specific experiences, as may relate to graphical, animation, audio, video, or other such experiences. The service provider might provide other content as well, as may be delivered through web pages, app content, and the like.

A request for content can be received to an interface layer 308 of the service provider environment 306, where the interface layer can include components such as APIs, Web servers, network routers, and the like. The components can cause information for the request to be directed to a content manager 310, or other such component, which can analyze information for the request to determine content to be provided, or an action to be performed, in response to the request. As mentioned, in some embodiments the request from the client device 302 can include feature or image data corresponding to an experience fingerprint, as well as other information such as identity, time, geolocation, etc., which can be useful in determining the appropriate experience to provide in response to the request. In some embodiments, processing the request can include validating a user credential to verify that the user has a current account that provides access to the corresponding experience. In other embodiments such an account is not necessary, as any user having the application or software can submit a request. In still other embodiments any user or source can submit such a request. Where account, session, or other information is available for a user, various types of information can be pulled from a user data store 318, for example, and used to determine a type of experience to provide in response to the request. The user information can include, for example, historical data, preference data, purchase history, view history, search history, and the like. In some embodiments a received credential is compared against information stored for the user in a user data store 312 or other such location.

In this example, once any verification, authentication, or authorization is performed, image and/or feature data for a fingerprint can be conveyed to a fingerprint manager 312, or other such system or service, that can analyze the information and determine the corresponding visual word. This can include, for example, determining the pattern data from the request and identifying a fingerprint that corresponds to the pattern data. This can include, for example, determining which cells of the fingerprint were selected and then comparing the data against a fingerprint database to determine a matching fingerprint, or at least to determine that the data corresponds to a valid fingerprint. Once the fingerprint is determined, the fingerprint manager 312 in this example can examine mapping information in a map data store 316, or other such location, to determine the appropriate visual word, identifier, or other concept associated with that fingerprint. The visual word information can then be transmitted to an experience generator 314, or other such system or service, which can take that information and provide the corresponding experience information in response to the request. In some embodiments the experience will be the same for all users submitting requests for that visual word over a determined period of time, such that the experience generator can contact the content manager 310 to cause the appropriate content to be obtained from a content repository 320 and provided to the client device 302. In some embodiments, at least some of this content can come from a content repository 326 maintained by a third party content provider 324 or other such source. As known for web pages and other such content, in some embodiments the response may include one or more links, addresses, or identifiers that the client device 302 can use to obtain the appropriate content. The content for the experience can include any appropriate content as discussed and suggested elsewhere herein, as may include text, graphics, audio, video, animation, game content, social content, and the like.

In at least some embodiments the experience to provide can depend at least in part upon additional data as well, at least where available. For example, if video content is to be provided then there might be a default video selected to provide for any request containing the corresponding fingerprint data but not including any other relevant data. For some experiences, there might be various criteria specified that can determine which video content is provided. For example, geolocation data might be used to provide different video content to people in different countries, where those videos might be in different languages. Similarly, different advertisers might pay to have video content displayed in different regions, such as in a region where the advertiser has stores or restaurants. In some embodiments a user may have specified a preference for a certain type of experience, such as video or animation versus audio or text, which can be used to determine the experience to provide. A user may have also expressed an interest in certain topics or subjects, either explicitly or implicitly through viewing or purchase history, etc. Other information can be used as well, such as whether a user has already been exposed to a specific experience or whether a user has taken an action with a type of experience, such as whether a user has made a purchase or downloaded an app after viewing a particular experience. The experience generator 314 can determine the appropriate experience criteria for the visual word, determine which values are available for those criteria with respect to the received request, and then determine the experience to provide based at least in part upon the values for those criteria. While for video content this can include identifying the video content to provide, for animations or textual content the content can be generated based at least in part upon the values for those criteria. In some embodiments there can be metadata stored in a metadata repository 322, or other such location, that can be used with the experience criteria or guidelines to determine or generate the experience as well, as may relate to content to provide for a specific location, at a particular time, etc.

A user or customer can also utilize a client device 302 to work with the experience generator 314 in providing the rules, criteria, content, or other aspects to be used to generate an experience for users with respect to a fingerprint. In at least some embodiments, an identifier or visual word can be selected for an experience, and a fingerprint generated that corresponds to the visual word. The fingerprint can be generated automatically using a generation algorithm, or manually using a determined fingerprint template. For example, a user can determine the logo (if available as an option), the colors, and the cells to be selected for the fingerprint. The fingerprint manager 312 can provide feedback as to whether or not a determined pattern is unique with respect to other fingerprints, and if not can prevent the fingerprint from being finalized and associated with the visual word until the fingerprint pattern selected is unique. In some embodiments there might also be rules to be enforced, such as may relate to a minimum number of selected cells in a fingerprint, some minimum level of entropy or separation of the cells (i.e., not a set of four contiguous cells), and the like. Once a fingerprint is selected, finalized, and approved, that fingerprint can be associated with the visual word (or identifier, etc.) and the mapping stored to the map repository 316 or other such location. The user can also provide guidelines for the type(s) of experience to be provided. As mentioned, in some embodiments it may be a specific experience, such as a video to be displayed or song to be played for requests received from any user over a period of time. There may also be dynamic aspects, which can depend upon the information such as time, location, etc. As mentioned, there can be rules provided as to how to generate or customize the experience for a specific user or device as well.

Figure 4A:
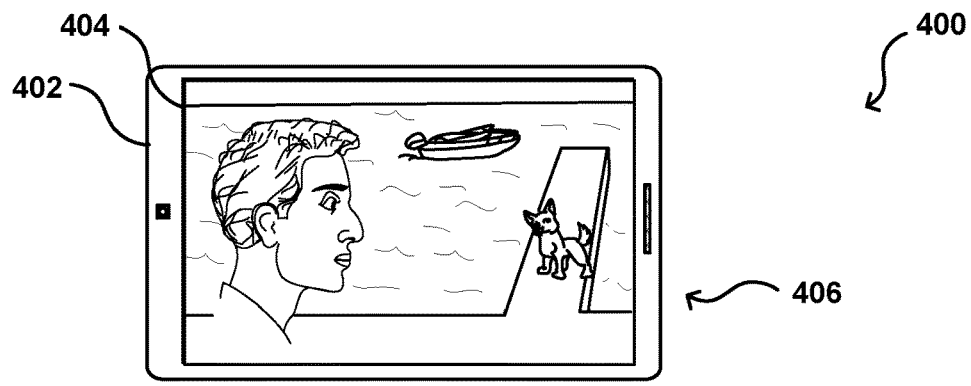
FIGS. 4A, 4B, and 4C illustrate example experiences that can be dynamically selected and/or generated in accordance with various embodiments.
Figure 4B:
Figure 4C:

FIGS. 4A, 4B, and 4C illustrate example experiences that can be provided to users in accordance with various embodiments. In a first example 400 illustrated in FIG. 4A, the experience can relate to video content 406 to be played on a display 404 of a computing device 402 for a user in response to scanning or imaging a particular fingerprint. The video could be a movie trailer, an instructional video, or other such content. As mentioned, the video content may be selected based on a location of the user, interests of the user, or other such information, and selected from a set of possible videos associated with the visual word of the fingerprint. In some embodiments the video may be selected based on which videos have previously been provided to that user in response to scanning that fingerprint. A second example experience 420 illustrated in FIG. 4B is customized or otherwise dynamically generated based at least in part upon the information available with the request. In this example, the geolocation of the device is used to determine content 422 associated with that location. The content in this example relates to an offer available to that user based on the user's location. The content includes information about a nearby location where the offer is available, and provides information about the location, such as the distance or directions. In some embodiments the fingerprint might be positioned at a fixed and known location such that all users scanning that fingerprint can obtain the same experience, but in other embodiments the fingerprint can be scanned at various locations and the content can differ based on the location. The offers, stores, distances, directions, and other aspects of the experience can differ based on location, user information, or other data associated with the request. Customized animations, audio, video, or other experiences can be provided based on the same or similar information as well. In some embodiments the type of experience may differ based on location, as an audio experience may be provided in a home environment while a text experience might be provided in a work environment, etc.

In at least some embodiments, the experience may involve other available devices as well. For example, in the arrangement 440 of FIG. 4C the user information indicates that an associated smart device is available, and based on the geolocation or other information it can be determined that the device is in a nearby location. In this example, the user has a smart device such as an Amazon Echo in the user's home, and based on the location or other information available it can be determined that the user is in a location proximate that device. Other devices might be available as well, such as smart televisions, smart lights, Internet-connected appliances, and so on. At least some of these devices can then be included in the experience. For example, a smart speaker might receive instructions over a network connection to begin playing a specific song, such as a song of the day. In the example 440 of FIG. 4C, the song is the rock song of the day, where it has been determined that the user has an interest in rock music or the fingerprint is associated with rock music, among other such options. For devices that are controlled by voice, gesture, or other mechanisms, the experience in some embodiments can involve providing the instructions from the client device. In the illustrated example, the computing device 442 can be instructed to play a voice command that includes the wakeword for the smart speaker 244 as well as an instruction as to the song to play. An advantage of the device speaking the command is that it is simple for the user and does not require the user to know the exact wording or terminology to obtain the desired experience. Such an approach also enables the experience to leverage the higher quality speaker in the smart speaker to play the audio rather than playing through the speaker(s) in the portable computing device. In some embodiments the computing device might be involved in the experience as well, such as to display content while the smart speaker 444 is playing the indicated song or audio file. A mechanism such as Bluetooth or WiFi can also enable the devices to communicate, such as may be useful to synchronize the experience between the devices. In some embodiments the user can use voice communications to interact with the smart speaker, which can then impact the experience provided via the computing device, among other such options.

In one example, a mobile shopping application can enable customers to scan the fingerprints, or other such unique visual patterns, to obtain related experiences. The fingerprints may be located in print and out-of-home ads, TV spots, websites, or shipping boxes, for example, and the scanning of the fingerprints can enable the users to receive experiences such as special offers, digital downloads, contest entries, virtual or augmented reality environments, and the like. For example, the user could receive a virtual reality experience that would enable the user to walk around a virtual car using a smartphone, or view an accessory or clothing item over an image of that user when looking in a mirror, etc. In one embodiment each fingerprint corresponds to a distinct composition according to a visual design language. The language can include millions of distinct compositions, generated by an algorithm and without a duplicate. Fingerprints can be included as a value-add in campaigns for product manufacturers who engage with a retailer to build a landing page featuring their products, whereby the manufacturers can receive a unique Fingerprint specific to their landing page as a vector graphic. The graphic can then be applied to other media channels as well. Thus, the manufacturer (or other such entity) can use the fingerprint on packaging, advertising, billboards, and the like, and any scanning of that fingerprint by a computing device can correspond in a determined experience being generated or provided for that device.

An advantage to the use of fingerprints with respect to other patterns such as QR codes is that the control of the experience is maintained in the cloud, or on a determined system, such that the experience can be changed as often as desired. As mentioned, QR codes hard code in the URL or other link such that the content cannot be changed without producing a new QR code. Further, since the mappings are all controlled on the server side it will be difficult for malicious actors to direct users to suspicious content. With a QR code, for example, a malicious actor can encode a link to a malicious website that can then potentially damage or gain unauthorized access to a device that follows that link upon scanning the QR code. With a fingerprint, no action will be taken outside those provided by the servers under control of the provider. Thus, even if a malicious actor generates a false fingerprint, the experience the user obtains will still be an approved experience, albeit possibly not related to the expectations of the user based on the context. A malicious actor would have to intercept the communications between the server and the device, which is much more complicated than printing out a malicious QR code.

Figure 5:
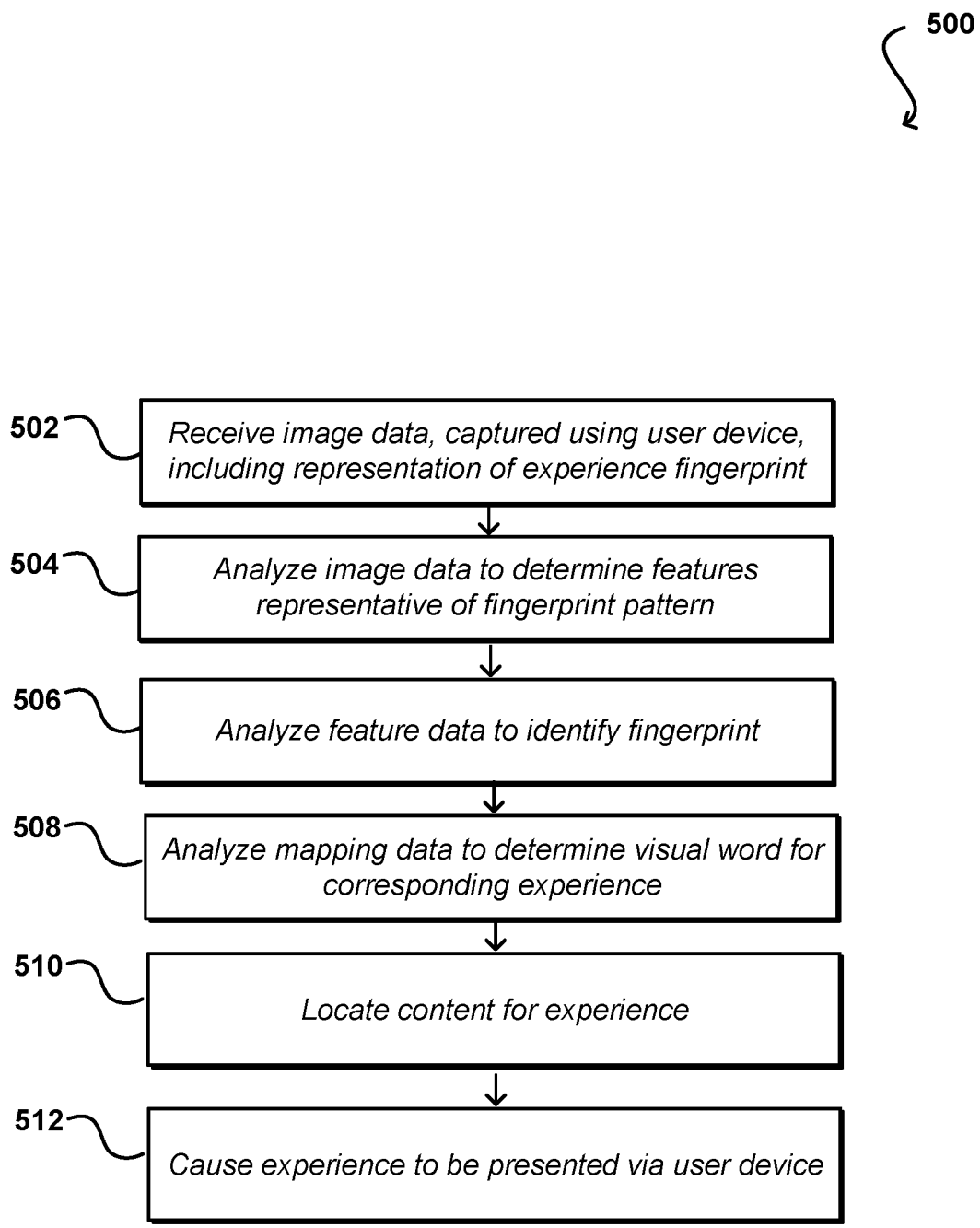
FIG. 5 illustrates an example process for providing an experience in response to scanning of an experience fingerprint that can be utilized in accordance with various embodiments.

FIG. 5 illustrates an example process 500 for providing a user experience in response to the scanning or imaging of an experience fingerprint that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, image data is received 502 that includes a representation of an experience fingerprint. The image data typically will have been captured using a camera of a portable computing device, such as a smart phone or wearable computer, although other mechanisms for obtaining the image data can be utilized as well. The image data can be analyzed 504 to determine features that are representative of the fingerprint pattern. As mentioned, these can be feature points or feature vectors determined using an edge, corner, or other feature detection algorithm, among other such options. The analysis can be performed on the user device, in the cloud or on a remote server, or using a combination thereof. Using the feature points, or as another portion of the analysis process, a source graphic such as a logo or glyph can be located in some embodiments. As mentioned, this can indicate a source or entity associated with the fingerprint, and can also provide information relating to orientation and scale where utilized, among other such options. The orientation of the fingerprint as represented in the image data may then be determined based at least in part upon the orientation of the source graphic. As mentioned, however, some fingerprint templates or patterns may be orientation agnostic such that the orientation does not need to be determined, but in this example where the fingerprint may be based on a square template where any cell of the array can be selected, it can be important to determine orientation because there may be fingerprints that contain the same relative selection of cells but with different orientations (e.g., rotated 90 or 180 degrees).

Once the feature data has been determined, as well as information about the source graphic where relevant, the data can be analyzed 506 to identify the fingerprint. As mentioned, this can include comparing the feature data against a set of known fingerprints for words of the visual language to determine a known fingerprint that has substantially the same feature data, such as a feature vector or set of feature points that match within a determined variation threshold or with at least a minimum match confidence. Methods for identifying an image or visual representation using feature data are well known in the art and as such will not be discussed in detail herein. Mapping data can then be analyzed 508 or consulted to determine the visual word for the recognized fingerprint. The visual word will be correlated with an experience to be presented in response to detection of the fingerprint data. Once identified, the content for that experience can be located 510 and the experience can be caused 512 to be presented via the user device. As mentioned, the content can be any appropriate content as may include text, graphics, audio, video, augmented reality, virtual reality, gaming, and other content, and combinations thereof. Causing the experience to be presented can include transmitting the content to the device or causing the device to obtain the content, as well as any other relevant tasks such as providing the appropriate software or information needed to provide the experience as discussed elsewhere herein.

Figure 6:
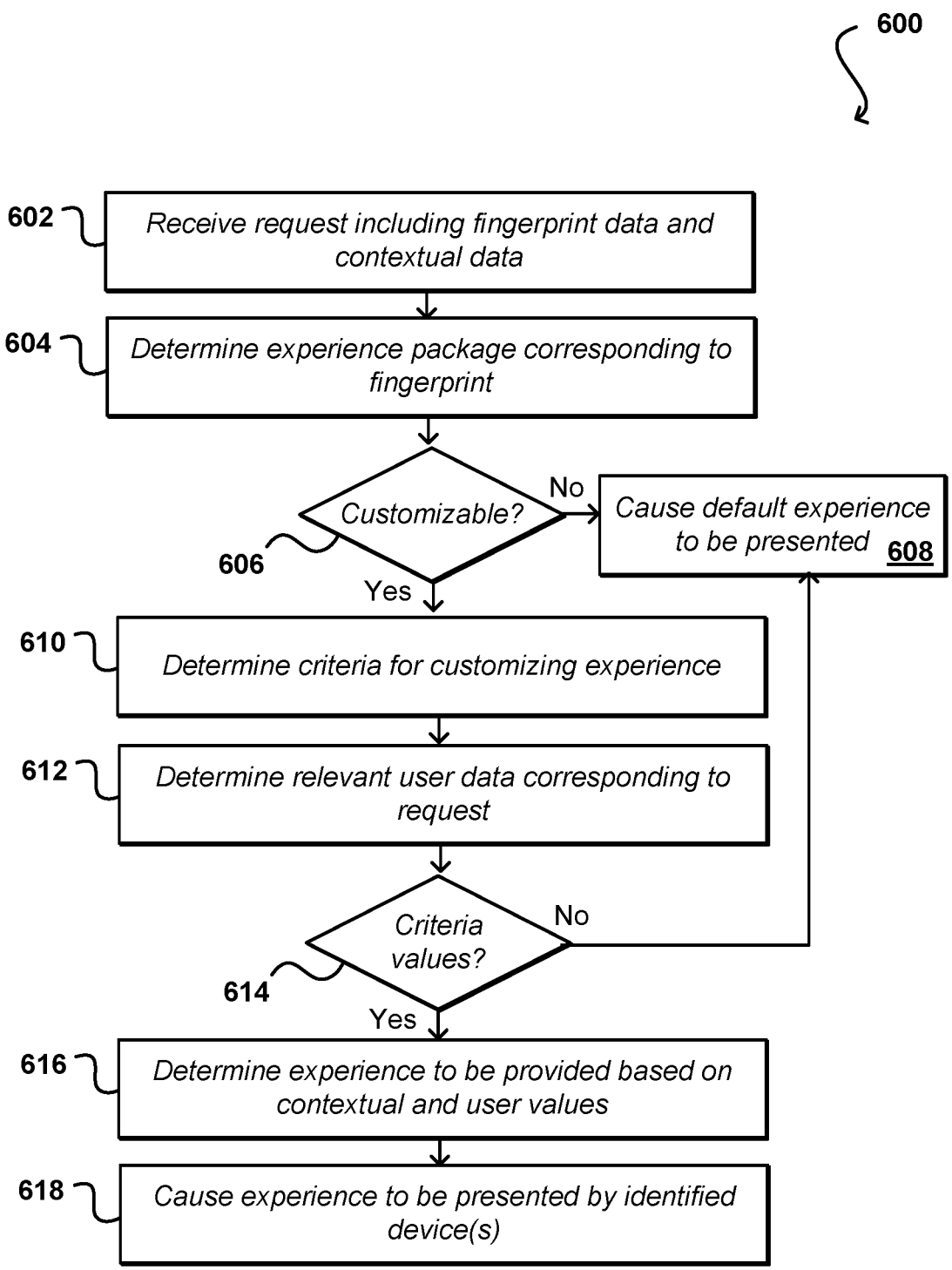
FIG. 6 illustrates an example process for generating a customized experience that can be utilized in accordance with various embodiments.

FIG. 6 illustrates an example process 600 for providing a customized experience that can be utilized in accordance with various embodiments. In this example a request is received 602 that includes fingerprint data and contextual data. The fingerprint data can include any appropriate data representative of an experience fingerprint, such as is discussed with respect to FIG. 5, and the contextual data can include any information that can be used to determine the appropriate experience to provide. The contextual data can include, for example, a user identifier, a session identifier, a device identifier, geolocation data for the user device, time of capture data, and the like. The fingerprint data can be used to determine 604 a fingerprint package, such as may be associated with a corresponding visual word, as discussed in more detail elsewhere herein. The fingerprint package can include information such as content that can be provided as part of experience, the types of experiences that can be provided, guidelines for the experience, and criteria to be used to determine the type of experience to provide, among other such options. A determination can be made 606 as to whether the experience is customizable, in that there are at least two possible experiences or experience variations that can be provided, or whether a single experience is to be provided for all requests involving that fingerprint, at least over a current period of time. If not, a default experience for the fingerprint can be determined and caused 608 to be presented via one or more appropriate devices.

If the experience is customizable, one or more criteria to be used in customizing the experience can be determined 610. As mentioned, these can include parameters such as past purchase history, location, time or date, user preference, user demographics, prior experience access, and the like. Relevant user data can also be determined 612 that can correspond to the request. As mentioned, the request can be associated with an account, profile, or session for the user or device, and there can be various associated data that can be used to determine the appropriate experience. A determination can be made 614 as to whether the contextual data or user data contain values for any of the experience criteria. If not, a default experience can be provided 608. If one or more values are available, the experience to be provided can be determined 616 based at least in part upon those values. This can include, for example, selecting one of a set of experiences or generating a new experience specific to one of more of those criteria values, among other such options. As mentioned, this can include selecting content in a relevant language for the location, including name or direction information in the content, causing the experience to take advantage of relevant available devices, and the like. Such an approach would enable a user to scan a fingerprint in a magazine at the beginning and end of an international flight, for example, and receive different experiences based on the different countries in which the fingerprint was scanned. The determined experience can be caused 618 to be presented using one or more identified devices, systems, or components. These can include, for example, a computing device that was used to capture the image data or submit the request, or another network-connected or communication-capable device that is associated with the user or computing device, or otherwise determined to be within an appropriate proximity of the user or device, etc.

Figure 7:
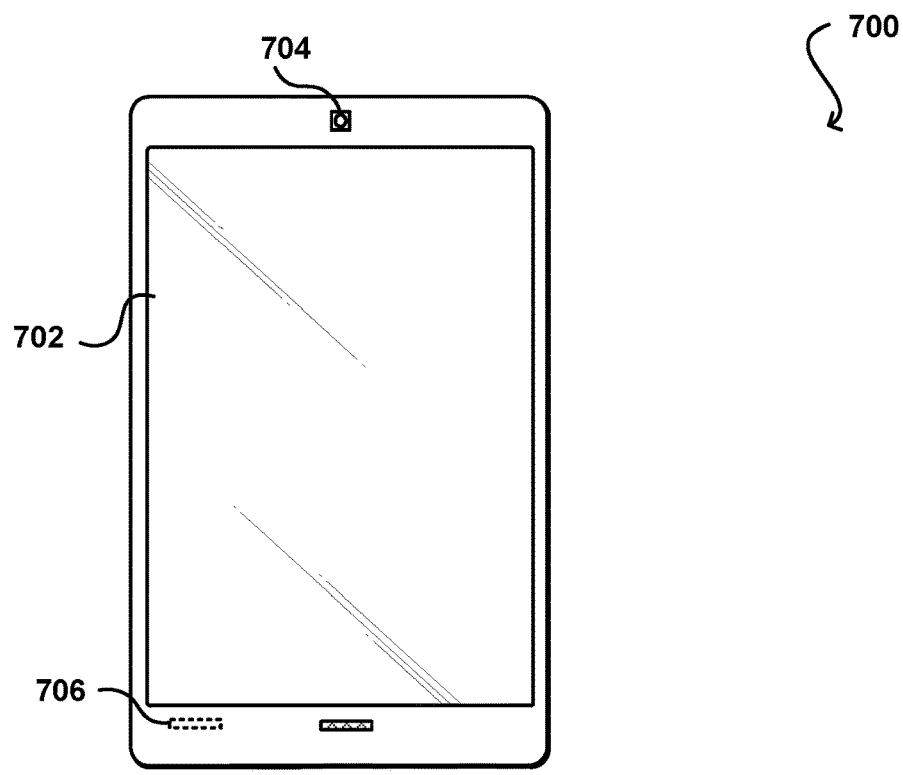
FIG. 7 illustrates an example computing device that can be utilized to implement aspects of the various embodiments.

FIG. 7 illustrates an example computing device 700 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others.

In this example, the computing device 700 has a display screen 702, which under normal operation will display information to a user (or viewer) facing the display screen (e.g., on the same side of the computing device as the display screen). The computing device in this example can include one or more image capture elements, including an image capture element 704 on the front or back of the device. It should be understood that additional or fewer image capture elements could be used, and could also, or alternatively, be placed on the sides, corners, or other locations on the device. The image capture elements may also be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data. As discussed herein, the device can include one or more motion and/or orientation-determining elements, such as an electronic compass and/or an electronic gyroscope, as well as an accelerometer, inertial sensor, global positioning sensor, proximity sensor, and the like, which can assist with movement and/or orientation determinations. The computing device can also include at least one networking component 706, such as a cellular, Internet, or Wi-Fi communication component, enabling requests to be sent and video content to be received to the device, among other such communications.

Figure 8:
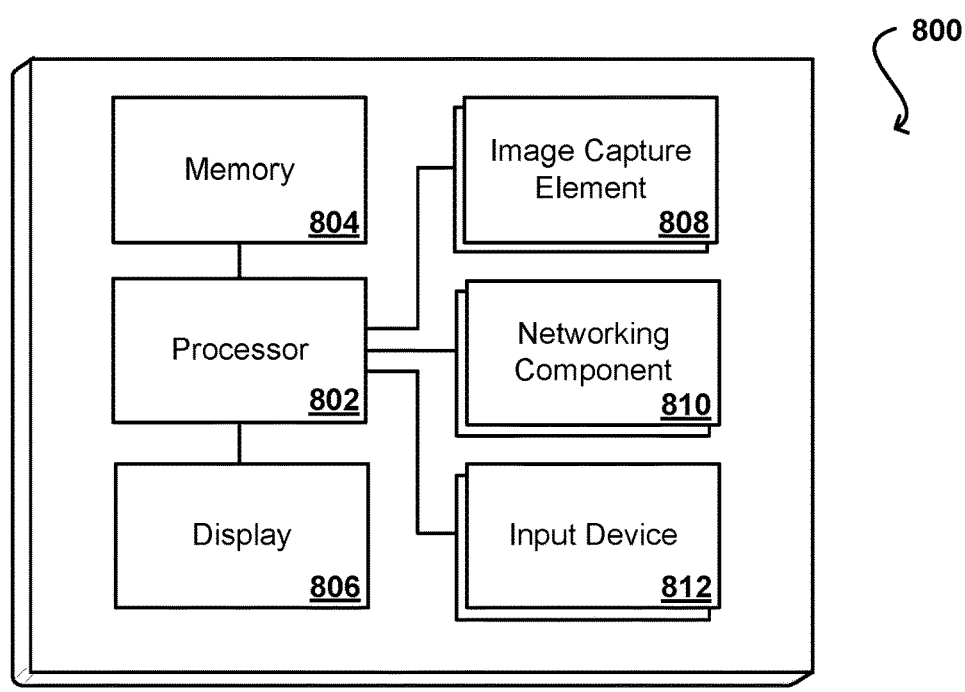
FIG. 8 illustrates components of an example computing device such as that illustrated in FIG. 7.

FIG. 8 illustrates a set of basic components of a computing device 800 such as the device 700 described with respect to FIG. 7. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device typically will include at least one type of display element 806, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 808, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc. The device can include at least one networking component 810 as well, and may include one or more components enabling communication across at least one network, such as a cellular network, Internet, intranet, extranet, local area network, Wi-Fi, and the like.

The device can include at least one motion and/or orientation determining element, such as an accelerometer, digital compass, electronic gyroscope, or inertial sensor, which can assist in determining movement or other changes in orientation of the device. The device can include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Pert, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices will also typically include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and other non-transitory media, such as, but not limited to, volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
  receiving, from a first electronic device, a request including fingerprint data, the fingerprint data corresponding to a visual fingerprint represented in image data captured by a camera of the first electronic device;
  identifying the visual fingerprint corresponding to the fingerprint data;
  determining a dynamic experience associated with the visual fingerprint;
  determining a second electronic device to present the dynamic experience based on a determined location of the first electronic device;
  identifying content to be presented for the dynamic experience; and
  causing at least a portion of the content to be presented by the second electronic device.

2. The computer-implemented method of claim 1, wherein the dynamic experience is further determined based on a determined location of the first electronic device.

3. The computer-implemented method of claim 2, wherein the dynamic experience corresponds to an offer, the method further comprising:

determining a nearby location relative to the location of the first electronic device where the offer is available, wherein the at least a portion of the content to be presented includes an identification of the nearby location.

4. The computer-implemented method of claim 1, wherein the dynamic experience is further determined based on a preference indicated for an account associated with the first device.

5. The computer-implemented method of claim 1, further comprising:
   determining an account associated with the first electronic device, wherein determining the second electronic device is based further on the second electronic device being associated with the account.

6. The computer-implemented method of claim 1, wherein causing the at least a portion of the content to be presented by the second electronic device includes causing the first device to communicate, to the second device, a wakeword and an instruction associated with the content.

7. The computer-implemented method of claim 6, further comprising:
   determining, based a type of device of the second device, the wakeword and the instruction.

8. The computer-implemented method of claim 1, wherein the request is associated with an account, the method further comprising:
   receiving a second request including the fingerprint data, the second request being associated with the account; and
   determining a second experience associated with the visual fingerprint to be presented by the second device.

9. The computer-implemented method of claim 1, further comprising:
   identifying second content to be presented for the dynamic experience; and
   causing the second content to be presented by the first electronic device.

10. The computer-implemented method of claim 1, wherein the visual fingerprint includes a pattern or a design which visually represents a visual word.

11. A system comprising:
   a processor; and
   a memory device including instructions that, upon being executed by the processor, cause the system to:
   receive, from a first electronic device, a request including fingerprint data, the fingerprint data corresponding to a visual fingerprint represented in image data captured by a camera of the first electronic device;
   identify the visual fingerprint corresponding to the fingerprint data;
   determine a dynamic experience associated with the visual fingerprint;
   determine a second electronic device to present the dynamic experience based on a determined location of the first electronic device;
   identify content to be presented for the dynamic experience; and
   cause at least a portion of the content to be presented by the second electronic device.

12. The system of claim 11, wherein the dynamic experience is further determined based on a determined location of the first electronic device.

13. The system of claim 12, wherein the dynamic experience corresponds to an offer, wherein the instructions, when executed, further cause the system to:
   determine a nearby location relative to the location of the first electronic device where the offer is available, wherein the at least a portion of the content to be presented includes an identification of the nearby location.

14. The system of claim 11, wherein the dynamic experience is further determined based on a preference indicated for an account associated with the first device.

15. The system of claim 11, wherein the instructions, when executed, further cause the system to:
   determine an account associated with the first electronic device, wherein determining the second electronic device is based further on the second electronic device being associated with the account.

16. The system of claim 11, wherein causing the at least a portion of the content to be presented by the second electronic device includes causing the first device to communicate, to the second device, a wakeword and an instruction associated with the content.

17. The system of claim 16, wherein the instructions, when executed, further cause the system to:
   determine, based a type of device of the second device, the wakeword and the instruction.

18. The system of claim 11, wherein the request is associated with an account, wherein the instructions, when executed, further cause the system to:
   receive a second request including the fingerprint data, the second request being associated with the account; and
   determine a second experience associated with the visual fingerprint to be presented by the second device.

19. The system of claim 11, wherein the instructions, when executed, further cause the system to:
   identify second content to be presented for the dynamic experience; and
   cause the second content to be presented by the first electronic device.

20. The system of claim 11, wherein the visual fingerprint includes a pattern or a design which visually represents a visual word.

* * * * *